(12) United States Patent
McAteer et al.

(10) Patent No.: US 10,521,410 B2
(45) Date of Patent: Dec. 31, 2019

(54) SEMANTIC GRAPH AUGMENTATION FOR DOMAIN ADAPTATION

(71) Applicant: International Business Machines Corporation, Armonk, NY (US)

(72) Inventors: Seamus R. McAteer, Navan (IE); Daniel J. McCloskey, Dublin (IE); Mikhail Sogrin, Kildalkey (IE)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 14/947,037

(22) Filed: Nov. 20, 2015

(65) Prior Publication Data

US 2017/0147635 A1    May 25, 2017

(51) Int. Cl.
*G06F 16/22* (2019.01)
*G06F 16/901* (2019.01)

(52) U.S. Cl.
CPC ...... *G06F 16/2246* (2019.01); *G06F 16/9024* (2019.01)

(58) Field of Classification Search
USPC ........................................................ 707/755
See application file for complete search history.

(56) References Cited

U.S. PATENT DOCUMENTS

| 8,442,940 | B1* | 5/2013 | Faletti | G06F 17/2785 704/9 |
| 8,606,743 | B2 | 12/2013 | Li et al. | |
| 8,661,004 | B2 | 2/2014 | Kementsietsidis et al. | |
| 8,719,006 | B2 | 5/2014 | Bellegarda | |
| 8,866,845 | B2* | 10/2014 | Leung | G06K 9/6892 345/633 |
| 9,246,853 | B1* | 1/2016 | Levy | H04L 67/00 |
| 9,632,654 | B1* | 4/2017 | Elassaad | G06F 3/0481 |
| 9,785,725 | B2* | 10/2017 | Srinivasan | G06F 16/248 |
| 9,798,829 | B1* | 10/2017 | Baisley | G06F 17/30958 |

(Continued)

FOREIGN PATENT DOCUMENTS

| CN | 101630314 A | 1/2010 |
| CN | 103207856 A | 7/2013 |

OTHER PUBLICATIONS

Fan, J. et al., "Automatic knowledge extraction from documents", IBM, IBM J. Res. & Dev., vol. 56, No. 3/4, Paper 5, May/Jul. 2012, pp. 5:1-5:10.

(Continued)

*Primary Examiner* — Cam Linh T Nguyen
(74) *Attorney, Agent, or Firm* — Francis Lammes; Stephen J. Walder, Jr.; William J. Stock

(57) ABSTRACT

A mechanism is provided for semantic graph augmentation for domain adaptation. A semantic graph is provided based on a knowledge base in which concepts are linked by semantic relationships. A domain corpus of content in a new target domain is analyzed for adaptation with reference to one or more resources that provide syntactic analysis of the domain content that links portions of the domain corpus to existing concepts and links in the semantic graph. Triples are extracted from the analysis of the domain corpus of any two concepts that share a linking syntactic relationship. The triples are evaluated as potential relationship assertions. A relationship assertion is selected for addition as a new link between existing concepts in the semantic graph.

21 Claims, 11 Drawing Sheets

(56) References Cited

U.S. PATENT DOCUMENTS

| | | | |
|---|---|---|---|
| 9,997,157 B2* | 6/2018 | Akbacak | G10L 15/18 |
| 10,318,583 B2* | 6/2019 | Feinberg | G06F 16/9024 |
| 2007/0094210 A1* | 4/2007 | Craig | G06N 5/02 |
| | | | 706/50 |
| 2009/0287678 A1 | 11/2009 | Brown et al. | |
| 2010/0153324 A1* | 6/2010 | Downs | G06F 17/2745 |
| | | | 706/21 |
| 2010/0228693 A1* | 9/2010 | Dawson | G06F 17/2705 |
| | | | 706/12 |
| 2010/0262477 A1* | 10/2010 | Hillerbrand | G06Q 30/02 |
| | | | 705/14.16 |
| 2010/0287478 A1* | 11/2010 | Avasarala | G06F 16/93 |
| | | | 715/737 |
| 2010/0318613 A1* | 12/2010 | Souza | G06Q 10/107 |
| | | | 709/206 |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0053070 A1* | 2/2014 | Powers | G06F 16/26 |
| | | | 715/708 |
| 2014/0250047 A1* | 9/2014 | Bounouane | G06N 7/005 |
| | | | 706/52 |
| 2014/0344213 A1* | 11/2014 | Kent | G06Q 50/01 |
| | | | 707/608 |
| 2015/0095303 A1 | 4/2015 | Sonmez et al. | |
| 2015/0370787 A1* | 12/2015 | Akbacak | G06F 17/2836 |
| | | | 704/2 |
| 2016/0012336 A1* | 1/2016 | Franceschini | G06F 17/30616 |
| | | | 706/55 |
| 2016/0283589 A1* | 9/2016 | Bostick | G06F 17/30734 |

OTHER PUBLICATIONS

Galitsky, Boris A. et al., "From Generalization of Syntactic Parse Trees to Conceptual Graphs", Springer Berlin Heidelberg, http://link.springer.com/chapter/10.1007/978-3-642-14197-3_19, Conceptual Structures: From Information to Intelligence, Lecture Notes in Computer Science, vol. 6208, Abstract only, Jul. 26-30, 2010, 3 pages.

High, Rob, "The Era of Cognitive Systems: An Inside Look at IBM Watson and How it Works", IBM Corporation, Redbooks, Dec. 12, 2012, 16 pages.

Judge, John et al., "Galaxy: IBM Ontological Network Miner", Gesellschaft fur Informatik, Bonn, Proceedings of the 1st Conference on Social Semantic Web (CSSW), Leipzig, Germany, Lecture Notes in Informatics, vol. P-113, Sep. 26-28, 2007, pp. 157-160.

Leskovec, Jurij et al., "Extracting Summary Sentences Based on the Document Semantic Graph", Microsoft Corporation, http://www.cs.cmu.edu/~jure/pubs/nlpspo-msrtr05.pdf, Microsoft Research Technical Report MSR-TR-2005-07, Jan. 31, 2005, 9 pages.

Mac An Tsaoir, Ronan, "Using Spreading Activation to Evaluate and Improve Ontologies", ACL, http://www.aclweb.org/anthology/C/C14/C14-1211.pdf, Proceedings of COLING 2014, the 25th International Conference on Computational Linguistics: Technical Papers, Dublin, Ireland, Aug. 23-29, 2014, pp. 2237-2248.

McCord, M.C. et al., "Deep parsing in Watson", IBM J. Res. & Dev. vol. 56 No. 3/4 Paper 3, May/Jul. 2012, pp. 3:1-3:15.

Mousavi, Hamid et al., "Harvesting Domain Specific Ontologies from Text", IEEE Computer Society, http://aacc.cs.ucla.edu/~zaniolo/papers/OntoHarvester-ICSC14%20v3.pdf, Proceedings of the 2014 IEEE International Conference on Semantic Computing (ICSC'14), Newport Beach, CA, Jun. 16-18, 2014, pp. 211-218.

Prokofyev, Roman et al., "Ontology-Based Word Sense Disambiguation for Scientific Literature", Springer Berlin Heidelberg, Proceedings of the 35th European conference on Advances in Information Retrieval (ECIR'13), Moscow, Russia, Mar. 24-27, 2013, pp. 594-605.

Recupero, Diego R. et al., "SHELDON: Semantic Holistic framEwork for LinkeD ONtology data", Springer International Publishing, http://challenge.semanticweb.org/2014/submissions/swc2014_submission_1.pdf, Knowledge Engineering and Knowledge Management, Lecture Notes in Computer Science, vol. 8982, Apr. 21, 2015, 8 pages.

Volot, Francoise et al., "Structuration and Acquisition of Medical Knowledge. Using UMLs in the Conceptual Graph Formalism", AMIA, http://www.ncbi.nlm.nih.gov/pmc/articles/PMC2850667/pdf/procascamc00002-0720.pdf, Proceedings of the Seventeenth Annual Symposium on Computer Application in Medical Care, Washington, DC, Oct. 30-Nov. 3, 1993, pp. 710-714.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

SEMANTIC GRAPH AUGMENTATION FOR DOMAIN ADAPTATION

BACKGROUND

The present invention relates to semantic graphs, and more specifically, to semantic graph augmentation for domain adaptation.

Graphs of semantic concepts and relationships derived from structured knowledge are an extremely valuable resource for high-precision natural language processing (NLP) systems. However, they cannot possibly encode all human knowledge in a given domain, and are therefore susceptible to gaps in available semantic structure that can reduce accuracy in unseen contexts.

Existing techniques to resolve this problem can involve, for example, a) flexible weighting strategies for graph activation, b) selective curation of knowledge that is included in the graph, or c) the use of additional techniques and resources to assist in specific problematic scenarios, like parts of speech (POS) filtering.

Flexible weighting strategies for graph activation allow a graph to be used in domains and contexts that were not originally intended, by changing how the signal can move through the graph due to the weighted relevance of particular categories of semantic data. This relies heavily on existing graph structure. There will always be contexts for which supplementary knowledge is the only possible solution. However, adding supplementary knowledge usually requires intervention from domain experts, which can be extremely expensive.

Selective curation of knowledge that is included in the graph is an error prone process that involves pruning the graph for apparently irrelevant content, in order to facilitate better connectivity among concepts that are present in the data set. For this method, the result is less reflective of the original semantics of the intended domain, so the conclusions drawn from the graph are of questionable quality. In addition, although it may apparently fix certain performance or contextual issues, the potential coverage of the graph for new scenarios and unseen text is greatly reduced.

The use of additional techniques and resources to assist in specific problematic scenarios, like part of speech (POS) filtering, can often help to fix issues of contextual ambiguity. Activating the graph with irrelevant concepts, can skew the resulting output significantly. However, in highly connected domains like medical literature, it is difficult to know when a particular concept is relevant. For example, the word "was" is a Chemical Compound in the UMLS knowledge base. Applying a POS-tagger to the text, so that concepts that exhibit incompatible values (such as past-tense verb instead of noun), can help a lot. However, the POS-tagger must be of high quality, and ambiguity on the same POS tag is not resolved here.

SUMMARY

According to a first aspect of the present invention there is provided a computer-implemented method for semantic graph augmentation for domain adaptation, comprising: providing a semantic graph based on a knowledge base in which concepts are linked by semantic relationships; analyzing a domain corpus of content in a new target domain for adaptation with reference to one or more resources that provide syntactic analysis of the domain content that links portions of the domain corpus to existing concepts and links in the semantic graph; extracting triples from the analysis of the domain corpus of any two concepts that share a linking syntactic relationship; evaluating the triples as potential relationship assertions; and selecting a relationship assertion for addition as a new link between existing concepts in the semantic graph.

The described aspects of the invention provide the advantage of allowing automatic improvement of existing knowledge in a semantic graph, while maintaining high quality output without the need for a domain expert.

The one or more resources may include one or more of the group of: shallow syntax parsers, deep syntax parsers, and named entity recognizers. Extracting triples for any two concepts that share a linking semantic relationship may extract triples due to collocation or ordered pattern in parse tree structures or syntactic frames. A triple may be formed of a subject, an object, and a linking relationship based on a syntactic relationship in the form of one of: a verb, noun-phrase constituents, possessive relationships in noun phrases, and other syntactic structures.

The method may also include updating the semantic graph to generate an augmented semantic graph including one or more new links between existing concepts.

Evaluating triples may include: statistically learning associated categories of concepts from unambiguous concepts that share a linking syntactic relationship. Evaluating triples may further include: scoring a potential relationship assertion according to learnt statistical data; and applying a threshold score for selection of a potential relationship assertion. Evaluating triples may further include: using scored potential relationship assertions to interpret ambiguous concepts that share a linking syntactic relationship. Evaluating triples may also include: receiving input of manual constraints of triples using relationship assertions.

Extracting triples may include: dynamically configuring a spreading activation strategy to boost the relevance of concept and relationship types; and activating the semantic graph during processing of the domain corpus and performing word sense disambiguation and induction to filter irrelevant triples and/or generate triples.

Evaluating triples as potential relationship assertions may consider the directionality of potential relationship assertions and how they affect concepts at higher and lower levels of meaning and ensuring that a new link between concepts is only applied at appropriate levels.

Selecting a relationship assertion for addition as a new link may be configured to be confined to leaf-level concepts only in the semantic graph or to extend to a higher-level concept based on an explicit assertion in the domain corpus.

According to a second aspect of the present invention there is provided a system for semantic graph augmentation for domain adaptation, comprising: a processor and a memory configured to provide computer program instructions to the processor to execute the function of components; a semantic graph providing component for providing a semantic graph based on a knowledge base in which concepts are linked by semantic relationships; a corpus analyzer component for analyzing a domain corpus of content in a new target domain for adaptation with reference to one or more resources that provide syntactic analysis of the domain content that links portions of the domain corpus to existing concepts and links in the semantic graph; a triple extraction component for extracting triples from the analysis of the domain corpus of any two concepts that share a linking syntactic relationship; an assertion generator component for evaluating the triples as potential relationship assertions; and a link providing component for selecting a relationship assertion for addition as a new link between existing concepts in the semantic graph.

The one or more resources may include one or more of the group of: shallow syntax parsers, deep syntax parsers, and named entity recognizers.

The link providing component may also be configured for updating the semantic graph to generate an augmented semantic graph including one or more new links between existing concepts.

The assertion generator component for evaluating triples may include: an unambiguous verb component having a statistical learning component for statistically learning associated categories of concepts that share a linking syntactic relationship. The assertion generator component for evaluating triples may further include: an assertion scoring component for scoring a potential relationship assertion according to learnt statistical data; and an assertion selector component for applying a threshold score for selection of a potential relationship assertion. The assertion generator component for evaluating triples may further include: an ambiguous assertion component for using the scored potential relationship assertions to interpret ambiguous concepts that share a linking syntactic relationship. The assertion generator component for evaluating triples may also include an assertion input component for receiving input of manual constraints of triples using relationship assertions.

The triple extractor component for extracting triples may include: a spreading activation strategy component for dynamically configuring a spreading activation strategy to boost the relevance of concept and relationship types; and a graph activation component for activating the semantic graph during processing of the domain corpus and performing word sense disambiguation and induction to filter irrelevant triples and/or generate triples.

The assertion generator component for evaluating triples as potential relationship assertions may consider the directionality of potential relationship assertions and how they affect concepts at higher and lower levels of meaning and ensuring that a new link between concepts is only applied at appropriate levels.

The link providing component for selecting a relationship assertion for addition as a new link may be configured to be confined to leaf-level concepts only in the semantic graph or to extend to a higher-level concept based on an explicit assertion in the domain corpus.

According to a third aspect of the present invention there is provided a computer program product for semantic graph augmentation for domain adaptation, the computer program product comprising a computer readable storage medium having program instructions embodied therewith, the program instructions executable by a processor to cause the processor to: provide a semantic graph based on a knowledge base in which concepts are linked by semantic relationships; analyze a domain corpus of content in a new target domain for adaptation with reference to one or more resources that provide syntactic analysis of the domain content that links portions of the domain corpus to existing concepts and links in the semantic graph; extract triples from the analysis of the domain corpus of any two concepts that share a linking syntactic relationship; evaluate the triples as potential relationship assertions; and select a relationship assertion for addition as a new link between existing concepts in the semantic graph.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A technique is described whereby an existing semantic graph is augmented with new domain-sensitive links in order to better associate contextually relevant semantic concepts and relationships. This improves accuracy of the natural language processing task that uses this graph when processing domain text.

By augmenting the semantic graph with domain specific learning, the application of that augmented semantic graph to content analysis within the learned domain yields improved results.

Figure 1:
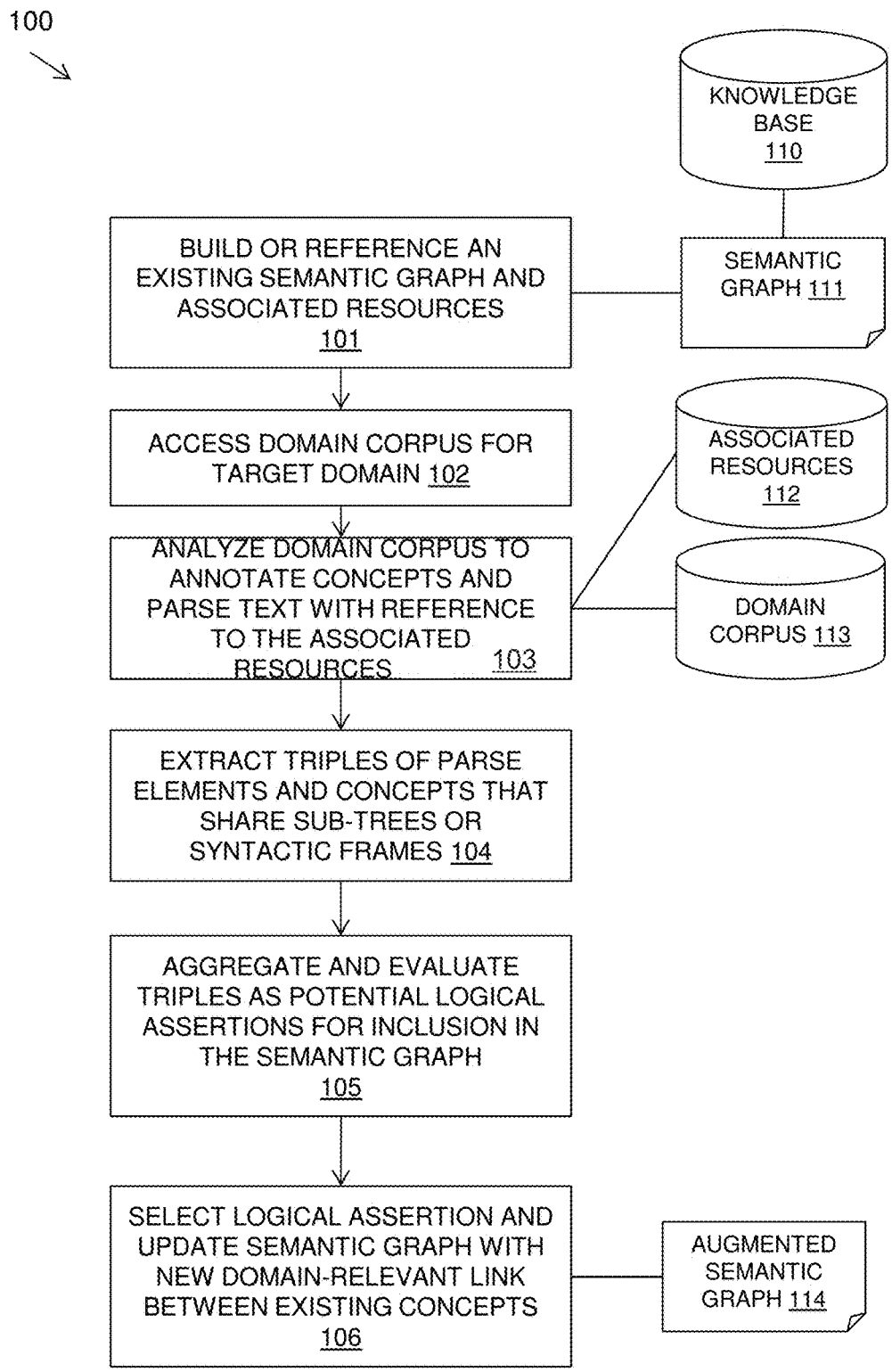
FIG. 1 is a flow diagram of an example embodiment of a method in accordance with the present invention.

Referring to FIG. 1, a flow diagram 100 shows an example embodiment of the described method.

A semantic graph 111 is built or referenced 101 together with associated resources 112. The semantic graph 111 may be built from a knowledge base 110. Associated resources 112 such as dictionaries and parsers to link concepts in the graph to pieces of text in a corpus may also be provided. In this described method, the semantic graph may be an existing pre-built graph, which may be expanded or augmented by the described method. If a semantic graph 111 and associated resources 112 are already generated, it is not necessary to revisit the original source or knowledge base 110.

The knowledge base 110 may be a resource description framework (RDF) store for conceptual description or modeling of information, or alternatively, an ontology naming and defining the types, properties, and interrelationships of entities of a particular domain. Generally speaking, any database of information, which may somehow constitute knowledge about a topic or domain can be used to derive a semantic graph that is amenable to augmentation using the proposed method. Even a simple table of rows and columns may be used, by selecting those elements that correspond to a particular domain relationship, e,g. from a database describing census data, columns A ,B, C might reflect a relationship of 'Dublin' in 'Ireland' has Population '550, 000'.

The term 'knowledge base' is meant here to include both the typical built-for-purpose semantic resources like RDF triple stores, and the more general sense that applies to any source from which semantic knowledge could be extracted. Techniques already exist to derive structured knowledge from raw natural language text, or even from images. A semantic graph for use with the proposed method may be built from any such resource.

A semantic graph 111 is a graph in which the vertices or nodes represent concepts and in which the edges represent relations between concepts. Semantic graphs at the level of ontology express vocabulary that is helpful for humans but may also be usable for machine processing, especially in natural language processing. The term 'concept' is intended here as a single representation for all possible forms of a given entity in a domain of knowledge, whether in natural language text, in images, or any other medium. Typically, such a representation is in the form of a URI (Uniform Resource Identifier), as specified in semantic web standards such as OWL (Ontology Web Language). In other cases, it could be an alphanumeric code, such as in UMLS (Unified Medical Language System) medical domain ontology that uses CUI (Concept Unique Identifier) codes. The only requirement is that the representation should be unique for every distinct concept.

In the described examples, a node in the semantic graph will simply be the unique identifier for a concept. Other information related to a concept, such as how this concept appears in text, is not required to be stored in the graph, and will have significant performance benefit if left out, but this is optional. Instead, additional associated resources 112 may be built from the same or related knowledge bases, or pre-existing associated resources 112 may be used, in order to discover the presence of concepts in processing domain corpora as described below.

A domain corpus 113 of a target domain may be accessed 102 on which the augmentation of the semantic graph is to be based.

The domain corpus 113 may be analyzed 103 to annotate concepts and parse text with reference to the associated resources 112 of the semantic graph 111. The same concepts that are built into the semantic graph 111 may now be identified in the target domain corpus 113. Parsing of text identifies the syntactic structures of a sentence, typically resulting in a parse tree or dependency structure, showing the syntactic relation of the words to each other. Shallow parsing techniques that identify important semantic frames like verb (subject, object) or noun-phrase sub-trees, are sufficient for the proposed method. However, a good quality deep parser may be used to identify more complex syntactic relationships between words and concepts, and is therefore preferred.

The method may automatically extract 104 triples of syntactic relationships and concepts. These may be concepts that share parse sub-trees or syntactic frames. The triples may be represented, for example, as verb (subj-obj) triples.

Although verb-frames are referenced in examples, other syntactic structures such as noun-phrase constituents or possessive relationships in noun phrases are also intended for use in the proposed method.

The extracted triples may be aggregated and evaluated 105 as potential logical assertions for inclusion in the semantic graph. This may be carried out by a number of different methods as described further below.

Logical assertions may be selected 106 for augmentation of the semantic graph and the semantic graph may be updated to form an augmented semantic graph 114 with added links between existing concepts.

Figure 2:
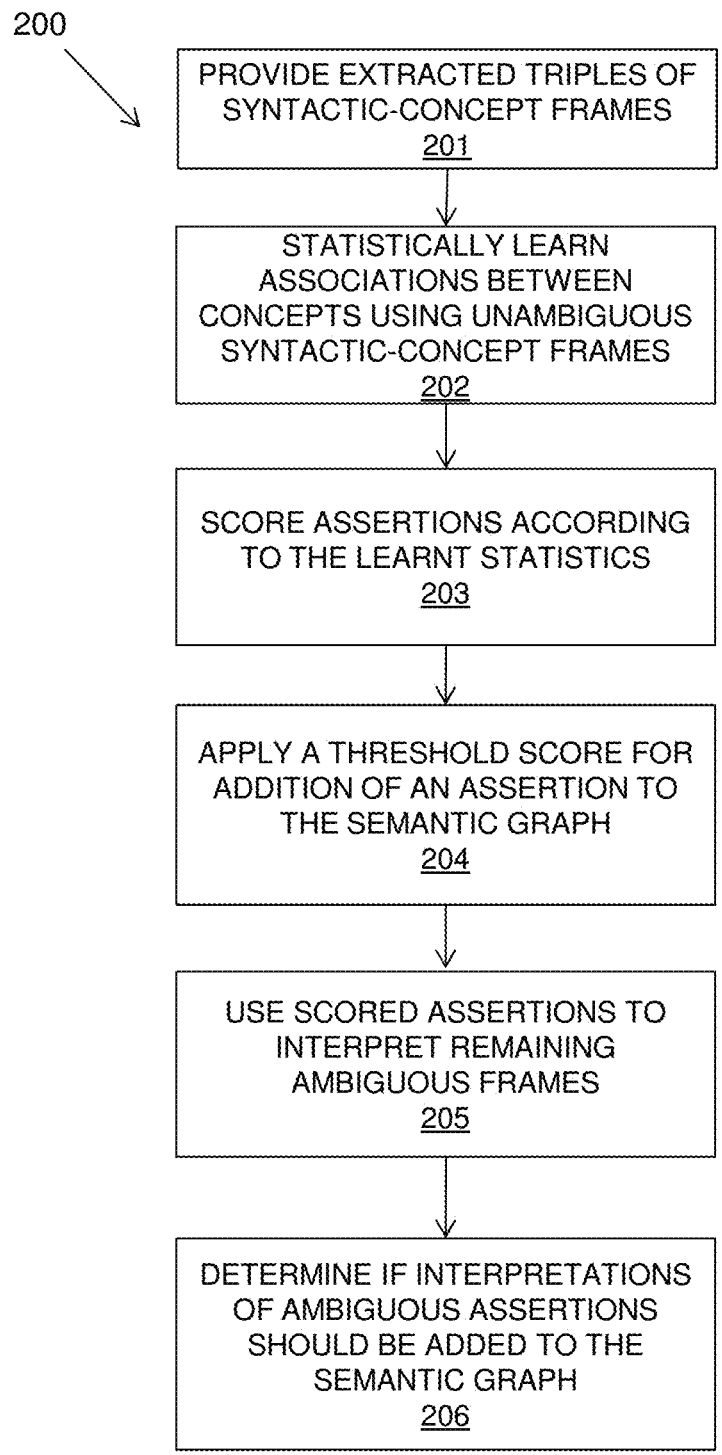
FIG. 2 is a flow diagram of a first example embodiment of an aspect of the method of FIG. 1 in accordance with the present invention.

Referring to FIG. 2, a flow diagram 200 shows a first example embodiment that describes the step of evaluating extracted triples of syntactic relationships and concepts as potential logical assertions for inclusion in the semantic graph. The first example embodiment is a fully automatic method.

Extracted triples of syntactic-concept frames are provided 201 for evaluation.

The method may statistically learn 202 which sets of concept categories are strongly associated from unambiguous syntactic-concept frames.

An ambiguous syntactic-concept frame in this context would involve a scenario where one or more of the words in the identified relationship has alternative meanings for the same word. An example is the phrase "The bat flew across the veranda", where the word "bat" may simultaneously describe a flying mammal, a piece of sporting equipment, or the shorthand name for the chemical batracylin. This may he carried out by a simple frequency count or other statistical metric such as a frequency-inverse document frequency (tf-idf) score, in order to derive the most likely interpretation of a given word. In the provided example, if the domain corpus contains many unambiguous examples of mammals, including bats, in the context of 'flying', with very few or no examples of chemicals Or sports equipment in such a context, the most statistically significant conclusion should be that the mammal 'bat' is the intended meaning of the word.

Logical assertions that describe relationships between concepts in the domain and are based on the extracted triples may be scored 203 and ranked according to the above statistical data. A threshold may be applied 204 to the logical assertion and, if above the threshold score, the assertion may be used to add a new link to the semantic graph between the concepts in the assertion.

The more highly scored logical assertions may then be used 205 to decide which interpretation of any remaining ambiguous syntactic-concept frames should be used, as described previously. It may then be determined 206 if a statistically relevant interpretation of an ambiguous frame assertion can now be added to the semantic graph.

In cases where there is sufficient evidence to suggest that multiple interpretations of a word in the context are equally valid, or sufficiently relevant, then the logical assertions may be left out or all included, according to the preference or particular requirements of the implementation. An example scenario could be where the word "bat" is associated with a) the general species of mammal, and the two sub-types of b) "vampire bat" and c) "fruit bat". In such cases, it may be statistically evident from the domain corpus that all instances of bat are associated with the body part "wings". In such a case, it may be acceptable to add the relationship between all ambiguous "bat" concepts and the body part.

Figure 3:
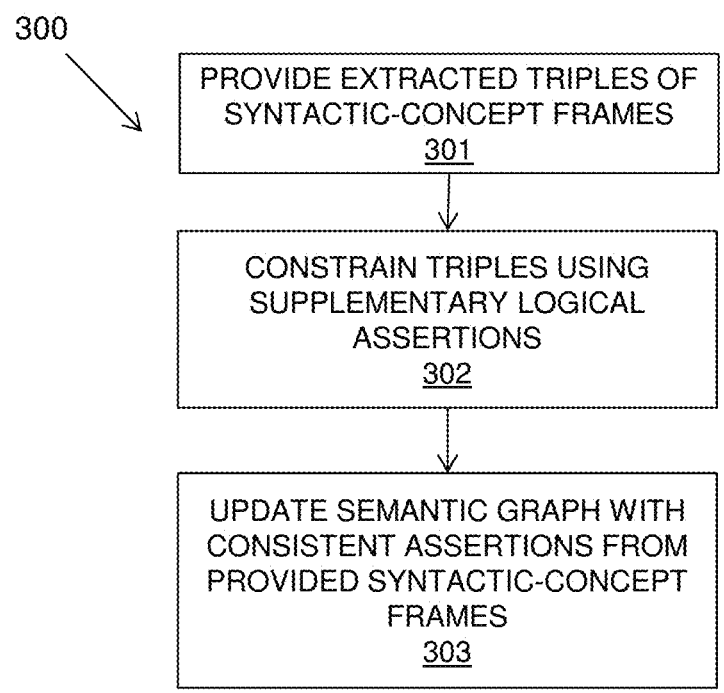
FIG. 3 is a flow diagram of a second example embodiment of an aspect of the method of FIG. 1 in accordance with the present invention.

Referring to FIG. 3, a flow diagram 300 shows a second example embodiment that describes the step of evaluating extracted triples of verbs and concepts as potential logical assertions for inclusion in the semantic graph. The second example embodiment may include manual input to the method.

In cases where the domain corpus does not have sufficient representation of suitable unambiguous contexts, manually generated assertions that specify how semantic categories may interact is helpful. The manual assertions may be used in cooperation with the automatic method of FIG. 2.

Ideally such logical assertions should come from experts in the domain of interest, so as to maximize the quality and influence of this input. Although any time required of domain experts can be expensive, the amount of input required is significantly less than that required to update the original knowledge base. It is also envisaged that services personnel that have some knowledge of the domain can provide suitable manual assertions in this manner, but that it would be a good idea to weight such manual assertions according to their known state of reliability.

Extracted triples of syntactic-concept frames are provided 301 for evaluation.

Using a set of input logical assertions, such as "Drugs have Chemical Compound ingredients", the triples may be constrained 302 based on the input logical assertions.

The semantic graph may be updated 303 with links based on consistent logical assertions from the provided synaptic-concept frames.

Since there are many different levels of semantic granularity of concepts possible in any given semantic graph, it should be noted that considerations are taken for the directionality of assertions and how they affect concepts at higher and lower levels of meaning. For instance, assertions that "mammals have body parts" and "bats have wings" are both at an appropriate level of granularity. However, the assertion that "mammals have wings" is not true for all mammals. Ensuring that additional links between concepts are only applied at appropriate levels is an important consideration for the proposed method. The addition of new links may be configured so as to be confined to leaf-level concepts only, such as "fruit bats have wings". Alternatively, it may be determined due to the explicit presence of assertions in the domain corpus, that "all mammals have a spine", and such a high-level assertion is therefore appropriate. This type of implementation decision will likely depend on the reliability of the domain corpus in question, and statistical relevance for any given assertion is preferred. Assertions that are provided by a manual step may be assessed for logical consistency in the domain corpus, and discarded or have their relevance diminished, according to the conflicting conclusions derived from the text, or assertions that do not hold for all instances of a given category.

Figure 4:
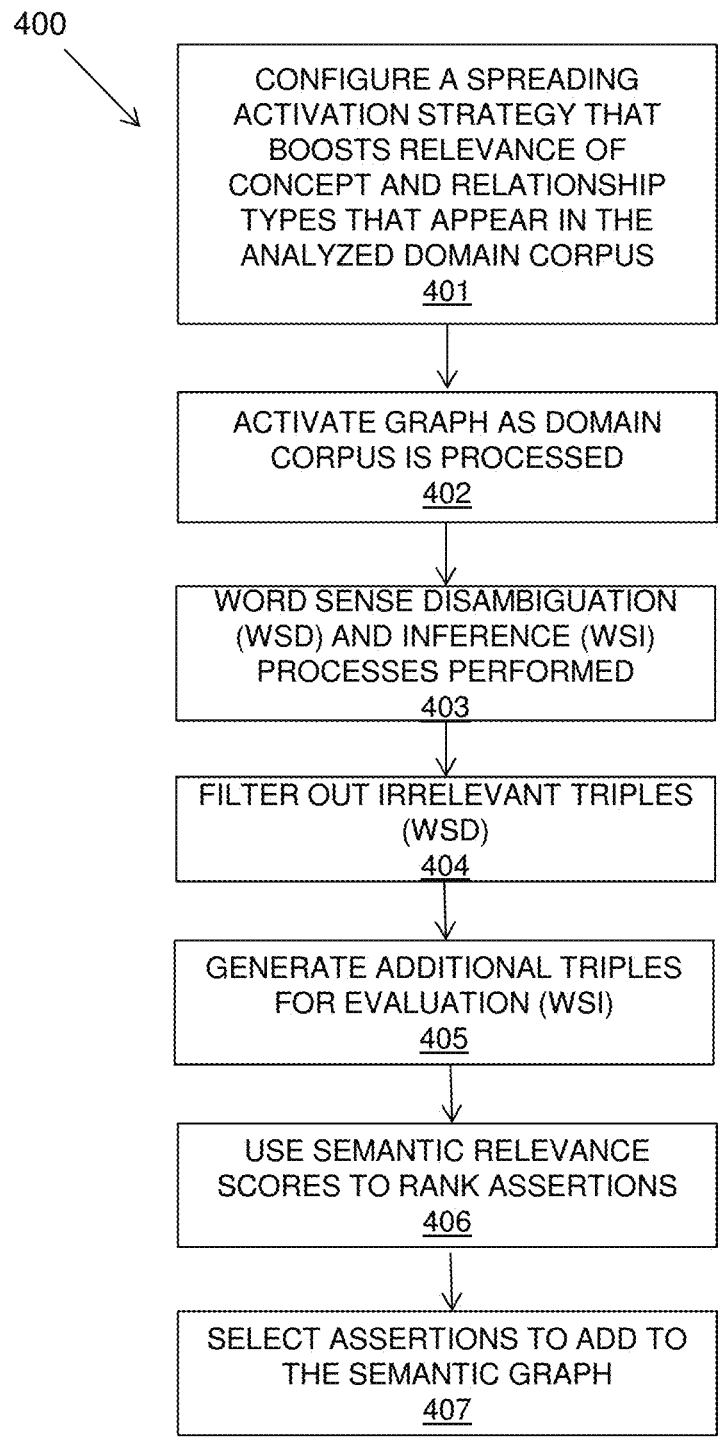
FIG. 4 is a flow diagram of a further example embodiment of aspects of the method in accordance with the present invention.

Referring to FIG. 4, a flow diagram 400 shows a further example embodiment that describes the steps of extracting and evaluating extracted triples synaptic relationships and concepts as potential logical assertions for inclusion in the semantic graph. This example embodiment builds on existing graph-based techniques.

This method may dynamically configure 401 a spreading activation strategy that boosts the relevance of concept and relationship types that appear in the analyzed domain corpus.

A spreading activation strategy is described in the paper "Using Spreading Activation to Evaluate and Improve Ontologies" by Ronan Mac an tSaoir, Proceedings of COLING 2014, the 25$^{th}$ International Conference on Computation Linguistics: Technical Papers, pages 2237-2248, Dublin, Ireland, Aug. 23-29, 2014. This technique involves processing a document of text and activating nodes in the semantic graph as they are discovered, by propagating a signal from these nodes that then spreads through the graph, and accumulates potentially at other nodes which did not occur in the text. There are various different implementations of this basic idea, but one implemented by IBM Galaxy (IBM is a trademark of international Business Machines Corporation) is useful for the purposes of word-sense disambiguation and word-sense inference.

In this case, a configurable activation strategy may be employed which can dynamically control how the signal will spread through the graph, according to the discovered characteristics of the domain corpus. For instance, if the domain corpus contains only 100 out of 130 possible semantic categories in the available knowledge, it should be considered that these 100 are likely to be more relevant than the 30 or so that never appear. The spreading signal that encounters the categories that do not exist might diminish at a greater rate of decay, and similarly may be boosted on encountering nodes that are associated with the relevant categories. Other types of configuration might involve the weighting of particular links between nodes in the graph, or the starting weight of the signal when particular nodes are initially activated. As described in the paper referenced above, the spreading signal may also be configured so as to overcome inherent deficiencies in the structural completeness of the semantic graph, further adapting the same graph to the domain in question.

As the domain corpus is processed, the semantic graph may be activated 402 and word sense disambiguation (WSD) and word sense induction (WSI) processes may be performed 403, in order to filter out 404 irrelevant triples and generate 405 additional triples for evaluation.

In addition to the described disambiguation process, where statistical relevance of concept assertions is used to decide on the appropriate interpretation of an ambiguous word, using the existing semantic graph to perform word-sense disambiguation as described in the paper referenced in the previous paragraph, can supplement this technique and improve accuracy. Additional triples that are not present in the text, may be inferred due to the presence of nodes in the graph that are deemed semantically relevant following spreading activation. This process, a kind of word-sense inference or induction, will allow the supplementing of triples extracted from the domain corpus with additional information that may help to score and rank, and ultimately decide whether or not to update the graph with new domain-specific assertions, as described previously.

Using either statistically derived or manual assertions, or both from the methods of FIGS. 2 and 3, the semantic relevance scores may be used following graph activation in each context to rank 406 the selection of additional semantic assertions. In the example implementation from IBM Galaxy, the spreading signal having traversed the graph and accumulated at the various nodes encountered, the nodes that maintain a suitable threshold of signal weight should be deemed semantically relevant. This information may be then be used to down-weight or increase the relevance of associated assertions extracted from the domain corpus. Consequentially, assertions that are deemed statistically relevant in the domain corpus, but which are deemed semantically irrelevant following spreading activation are examples of cases where the graph is not representative of the domain content. These types of discovery should be used to reconfigure the spreading activation strategy to improve semantic relevance scores for these concepts and assertions.

All or a top N from most semantically relevant assertions may be selected 407 to update the semantic graph. Even the full set is already filtered for ambiguity and domain relevance.

Medical Domain Example

A specific example is described in the field of Unified Medical Language Systems (UMLS).

A semantic graph may exist or be built from a UMLS RDF store. A target domain text may be analyzed and parsed using a dictionary of UMLS concepts and a good quality deep parser, such as IBM English Slot Grammar (ESG) parser.

Triples are extracted and associated frequencies of concepts and syntactic relationships using the parser output are used in order to limit context to syntactic-concept frames and parse sub-trees.

From frequency of association for unambiguous contexts, where concepts do not overlap, the method may learn which categories of semantic concept have suitable interaction, for example, UMLS Mammal and BodyPart.

Ambiguous assertions may be resolved, where multiple concepts overlap within the syntactic frames and parse trees, by selecting only those categories that match the set of acceptable interactions identified above.

In the example sentence "The bat's wings were clipped", "bat" can be identified as two separate concepts, "Mammal" C0008139 and "PharmacologicSubstance" C0053006; while "wings" is associated with a single concept "BodyPart" C0043189.

Since it is learned that "Mammal" and "BodyPart" commonly occur in the same parse sub-tree, such as in possessive noun phrases, it may be inferred that the most appropriate interpretation of "bat" in this context, is the "Mammal" meaning.

A new link may therefore be added between concepts "bat" (the mammal), and "wings" (the body part) directly into the semantic graph, and other such disambiguated concept patterns.

With this additional context-relevant connectivity, future uses of the semantic graph benefit from this additional knowledge, resulting in improved accuracy in NLP tasks.

This technique allows the automatic adaptation of a semantic graph for new domains, in order to improve accuracy for use in NLP tasks, without a requirement for domain expertise.

The semantic data already defined in the graph is the skeleton around which new semantic assertions may be expressed, according to the domain corpus content, removing the need for domain experts where a suitable domain corpus is available.

By focusing on existing concepts in the semantic graph that are within the same syntactic frame or parse sub-tree, the additional links in the graph may be limited to those that are highly relevant to the domain.

The syntactic relationship between concepts can help to match specific relationship types, or used to generate a new edge label in the graph, especially in the case of verbs, where the lexical form can reliably describe a specific interaction between concepts.

Any identified concept patterns may have associated semantic categories that may be used to constrain the set of new assertions. For instance, the domain corpus may have many references to a particular sub-group of all available knowledge in the graph or knowledge base, and this can help to limit the interpretations of words to the most statistically relevant meaning.

By focusing on a concept-level graph designed for spreading activation, such as those built by IBM Galaxy, see paper "Galaxy: IBM Ontological Network Miner" by John Judge, et al., existing techniques such as those used by IBM Galaxy and the spreading activation strategy described in the paper "Using Spreading Activation to Evaluate and Improve Ontologies" by Ronan Mac an tSaoir may be leveraged for resolving initial ambiguity and inferring additional contextual concepts not present in the text, in order to improve the performance of the proposed method.

The flexibility of activation strategies, as defined in the spreading activation strategy described in the paper "Using Spreading Activation to Evaluate and Improve Ontologies" by Ronan Mac an tSaoir is also amenable to improved domain sensitivity in the selection of new inter-concept linkage to add to the graph, through the customization of spreading signal weight according to the content of the domain corpus.

Figure 5A:
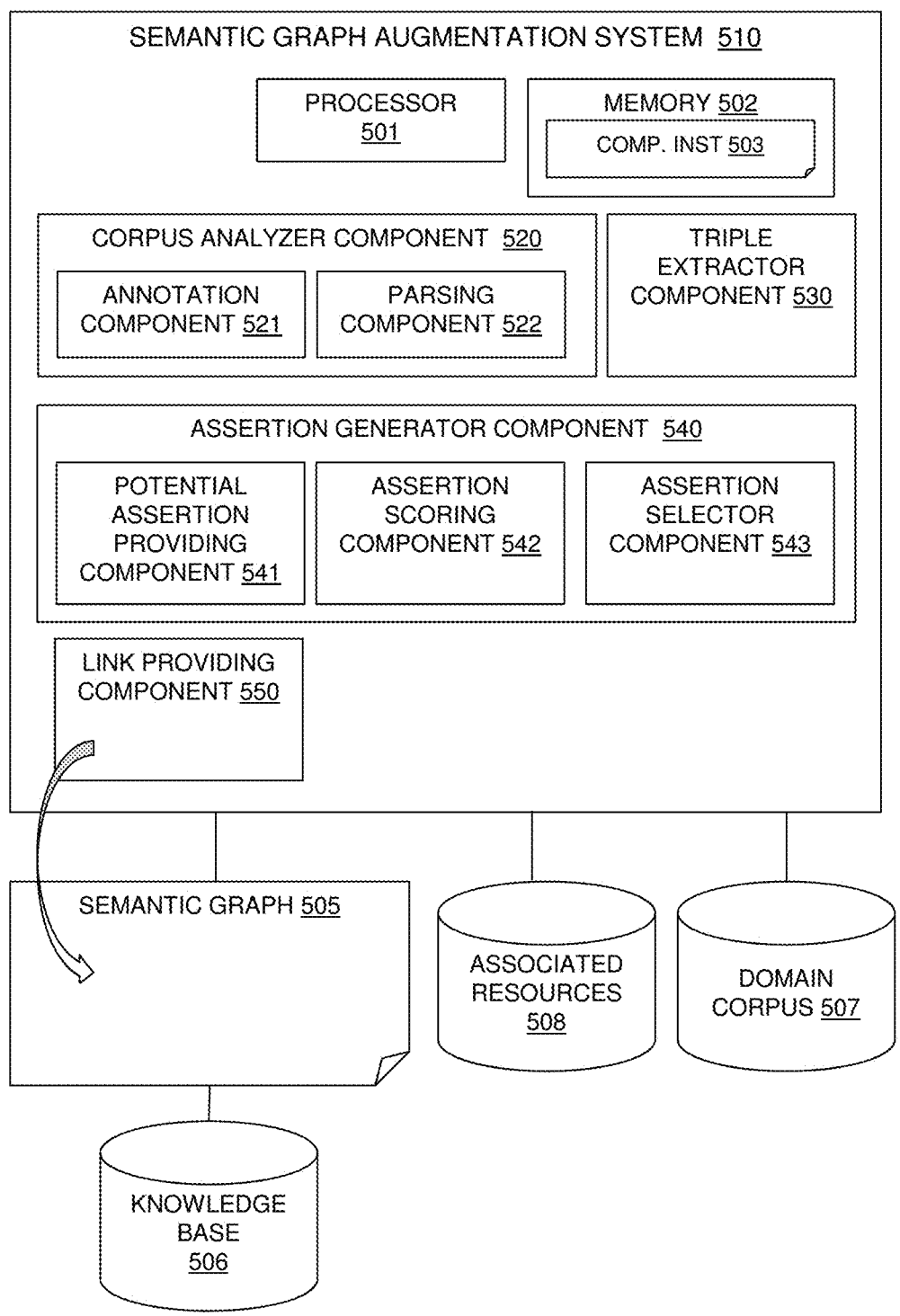
FIGS. 5A to 5C are block diagrams of example embodiments of a system in accordance with the present invention.
Figure 5B:
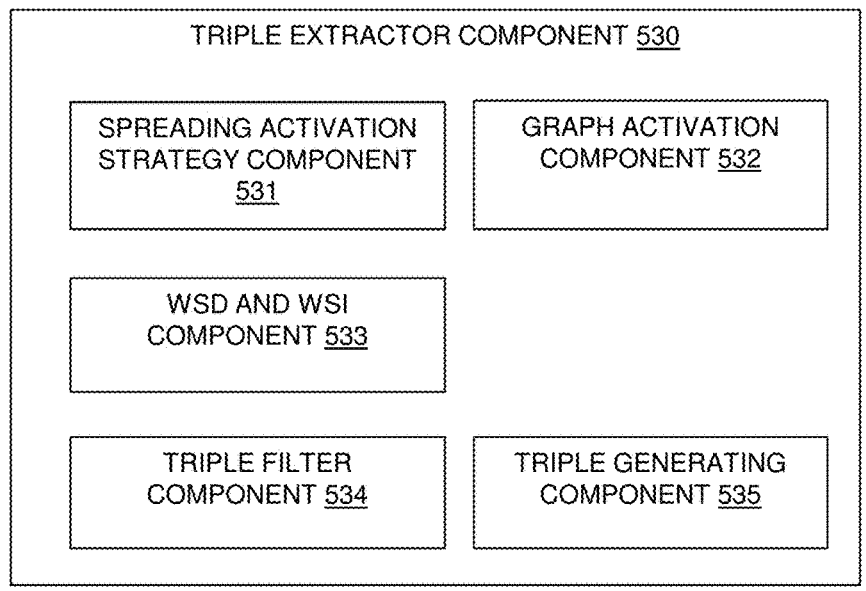
Figure 5C:
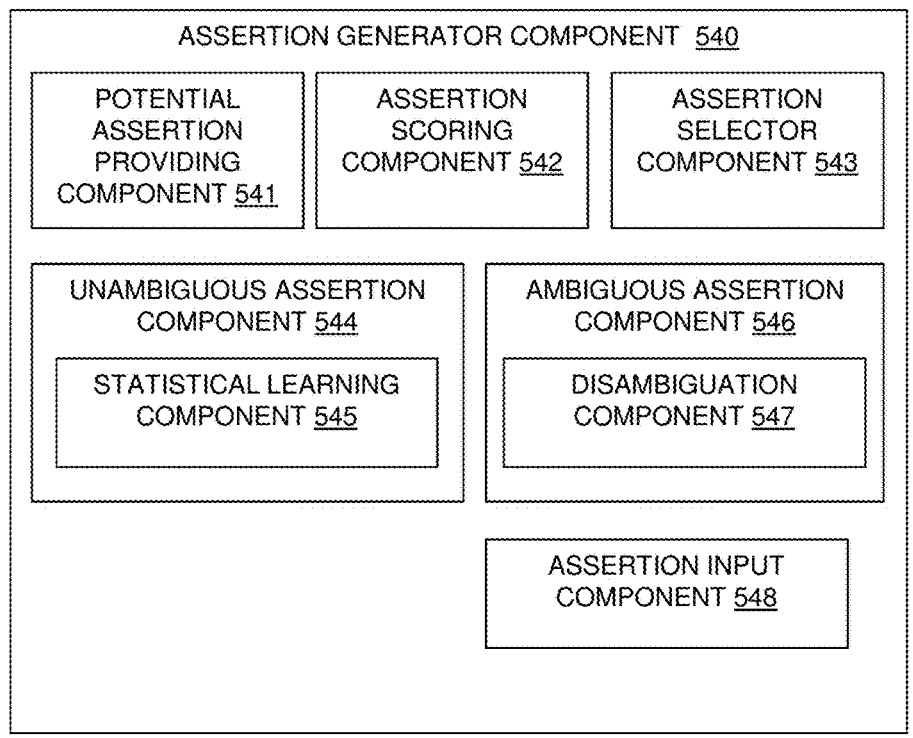

Referring to FIGS. 5A to 5C, block diagrams show an example embodiment of the described system.

A semantic graph augmentation system 510 is shown. This may be provided as part of a semantic graph creation system (not shown) or as an independent system for augmenting by adding additional links to an existing semantic graph 505 based on a knowledge base 506. The semantic graph augmentation system 510 may be based on one or more domain corpus 507 providing a domain context to the augmentation. Associated resources 508 may also be provided for reference related to the semantic graph 505.

The semantic graph augmentation system 510 may include at least one processor 501, a hardware module, or a circuit for executing the functions of the described components which may be software units executing on the at least one processor. Multiple processors running parallel processing threads may be provided enabling parallel processing of some or all of the functions of the components. Each component may be arranged to provide the described functionality. Memory 502 may be configured to provide computer instructions 503 to the at least one processor 501 to carry out the functionality.

The semantic graph augmentation system 510 may include a corpus analyzer component 520 for analyzing a domain corpus 507 of content in a new target domain with reference to one or more resources 508 that provide syntactic analysis of the domain content that links portions of the domain corpus to existing concepts and links in the semantic graph 505. The corpus analyzer component 520 may include an annotation component 521 for annotating concepts and a parsing component 522 for parsing text. The parsing component 522 may be a separate tool which may be one of the associated resources 508 which is accessed, such as a shallow or deep parsing tool.

The semantic graph augmentation system 510 may include a triple extractor component 530 for automatic extraction of triples of syntactic relationships and concepts that share parse sub-trees or syntactic-concept frames. Further details of an example embodiment of a triple extractor are provided with respect to FIG. 5B.

The semantic graph augmentation system 510 may include an assertion generator component 540 for generating new relationship assertions based on the extracted triples. The assertion generator component 540 may include a potential assertion providing component 541 for generating candidate assertions which may be scored by an assertion scoring component 542. An assertion selector component 543 may select an assertion for insertion into the semantic graph. Further details of the assertion generator component 540 are provided with respect to FIG. 5C.

The semantic graph augmentation system 510 may further include a link providing component 550 for providing new links in the semantic graph 505 for the selected assertions.

Referring to FIG. 5B, an example embodiment of the triple extractor component 530 is described based on the method described in FIG. 4.

The triple extractor component 530 may include a spreading activation strategy component 531 for dynamically configuring a spreading activation strategy. A graph activation component 532 may activate the semantic graph as the domain corpus is processed. A WSD and WSI component 533 may apply WSD and WSI processes. A triple filter component 534 may filter out irrelevant triples based on the output of the WSD component 533. A triple generating component 535 may generate additional triples based on the output of the WSI component 533.

Referring to FIG. 5C, an example embodiment of the assertion generator component 540 is described based on the methods described in FIGS. 2 and 3.

The assertion generator component 540 may include the component shown in FIG. 5A of a potential assertion providing component 541, an assertion scoring component 542 and an assertion selector component 543.

In addition, the assertion generator component 540 may include an unambiguous assertion component 544 that may include a statistical learning component 545 for learning which sets of concept categories are strongly associated from unambiguous syntactic frames and concepts. An ambiguous concept assertion 546 may include a disambiguation input component 547 for using the output of the statistical learning component 545 in order to disambiguate the assertions and thereby 544 to decide on a suitable interpretation of a previously ambiguous input assertion.

The unambiguous assertion component 544 and the ambiguous assertion component 546 may output assertions to the potential assertion providing component 541 and these may be scored by the assertion scoring component 542 for selection by an assertion selector component 543.

The assertion generator component 540 may also include an assertion input component 548 which may accept manual input of assertions which may be scored and selected.

Figure 6A:
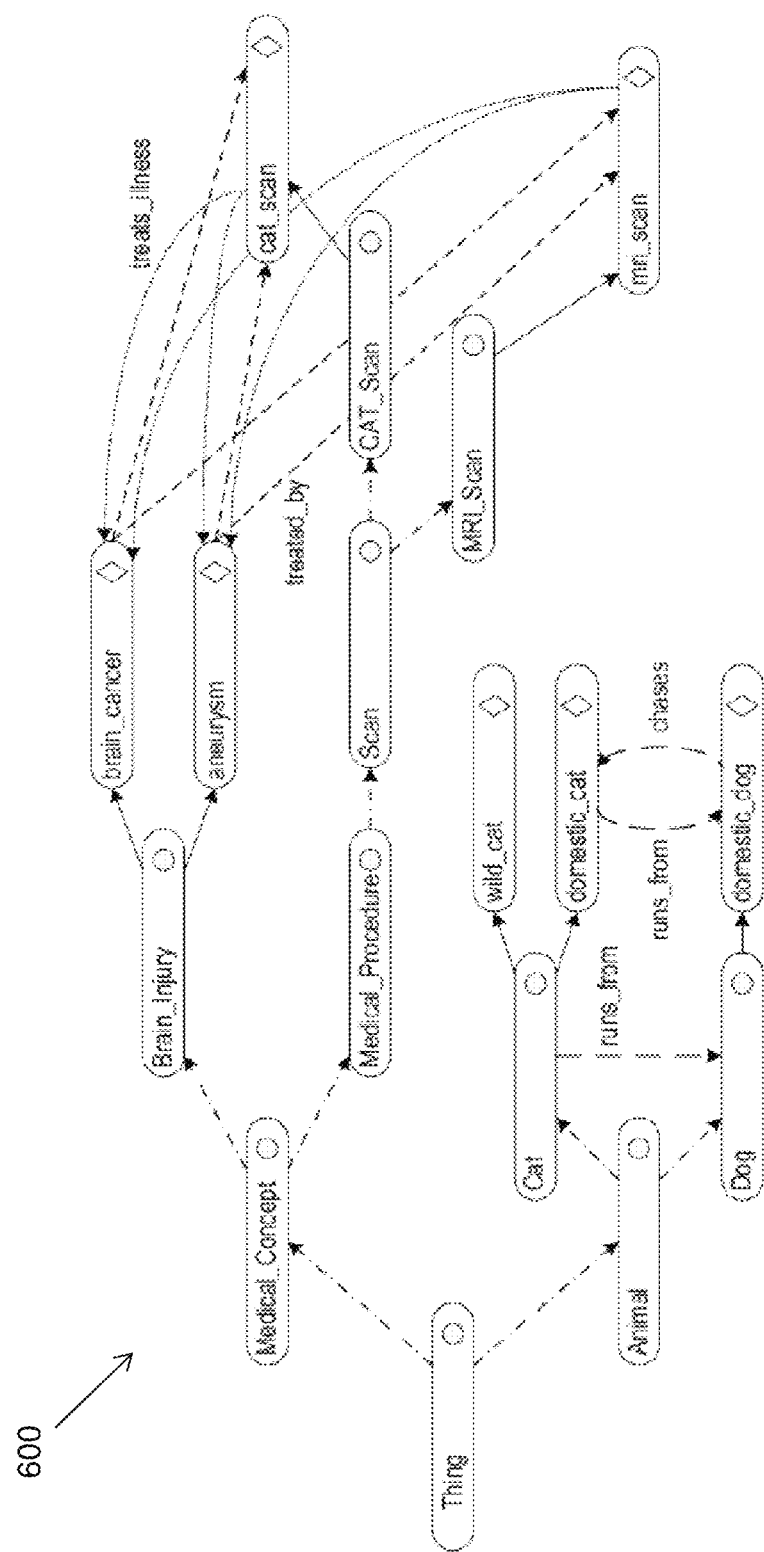
FIGS. 6A to 6C are schematic diagrams illustrating an example of the described method.
Figure 6B:
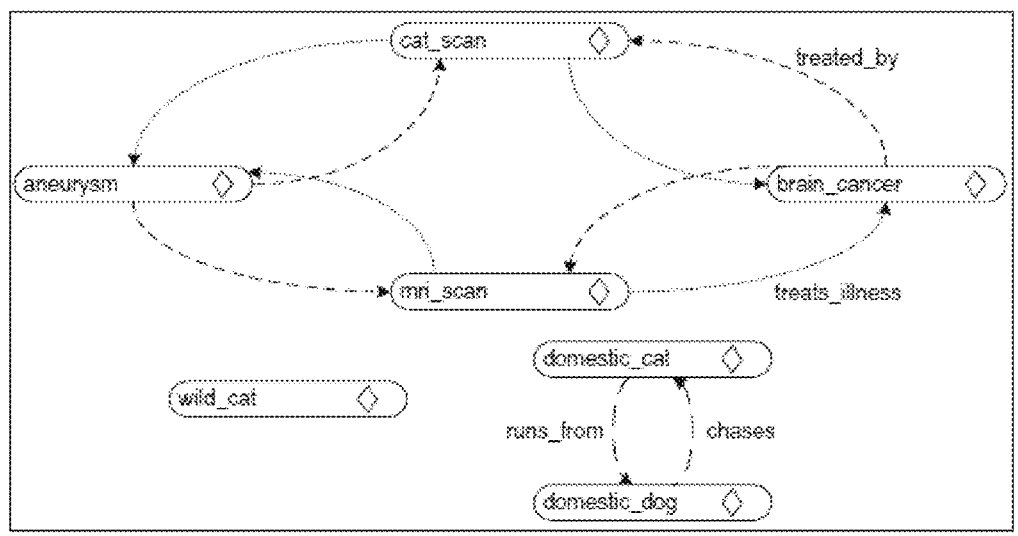
Figure 6C:
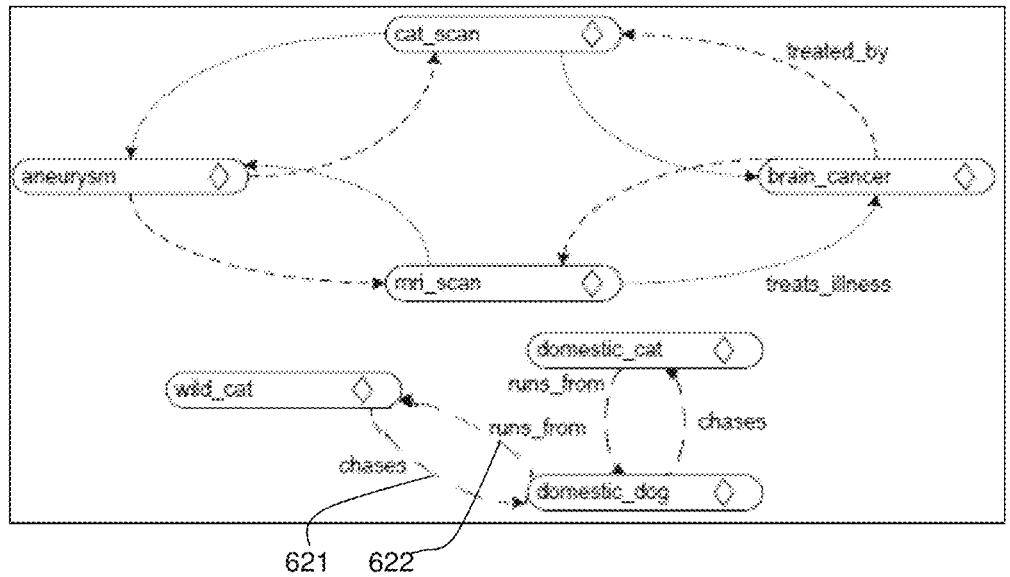

An example is now described with reference to FIGS. 6A, 6B and 6C. FIG. 6A shows a source knowledge base in the form of a cat ontology. FIG. 6B shows a derived original semantic graph in the form of an instance-only graph. FIG. 6C shows an augmented semantic graph with additional link based on a domain corpus in the form of a portion of text.

An existing knowledge base 600 describing interactions of the word "cat" is shown in FIG. 6A. Nodes are shown of classes (with a circle symbol) and instances of a class (with a diamond symbol). Taxonomical relationships (subclass/superclass of) are shown with an alternate hash/dot arrow. An instance of a relationship is shown as a solid arrow. Other relationship types are shown as other forms of hashed arrows.

The knowledge base 600 of FIG. 6A is used to build a semantic graph 610 of concepts and inter-concept relationships as shown in FIG. 6B.

An associated resource in the form of a set of associated text forms for these concepts is listed in Table A below.

TABLE A

| Concept ID | Associated Surface Forms |
|---|---|
| wild_cat | {lions, tigers, cat, cats, cub} |
| domestic_cat | {cat, cats, kitten} |
| domestic_dog | {dog, dogs, puppy, chihuahua} |
| brain_cancer | {brain carcinoma, brain tumour} |
| cat_scan | {cat, cats, cat scan} |

A new domain of content is provided which describes videos of dangerous animals treated as pets, as shown as a domain text portion below, for which the semantic graph was not developed, but is somewhat related.

"Dangerous Pets: A tiger cub frolics around on his owners' furniture. Things get both adorable and interesting when the family's other pet, a Chihuahua, decides that he wants to wrestle with what will end up being a huge and dangerous cat. The cub then chases the dog around the house, and the dog runs from the tiger to save its life!"

The following Table B demonstrates parse and concept ID triples, which may be used to infer new assertions in the semantic graph 610. In the domain text portion above, text that has corresponding semantic concepts in the graph is italicized. The text corresponding to extracted triples is underlined. The word "cat" is also highlighted in bold as it is ambiguous, according to the graph content.

TABLE B

| Predicate Triple | Concept ID Triple |
|---|---|
| chases (cub, dog) | chases (wild_cat, domestic_dog) |
| runs from (dog, tiger) | runs_from (domestic_dog, wild_cat) |

FIG. 6C demonstrates an augmented semantic graph 620 updated with assertions 621, 622 that correspond to the triples extracted from the domain text portion.

Given a word-sense disambiguation task performed on similar text using the original semantic graph, the word "cat" would be assumed to be domestic_cat, as this node is strongly associated with domestic_dog, which had no relationships with other nodes in the graph. Following the update to connect wild_cat with domestic_dog, wild_cat can now be activated by the word-sense disambiguation process and be selected as a likely meaning for "cat". This is done by adding new links 621, 622 between existing nodes in the augmented semantic graph.

Figure 7:
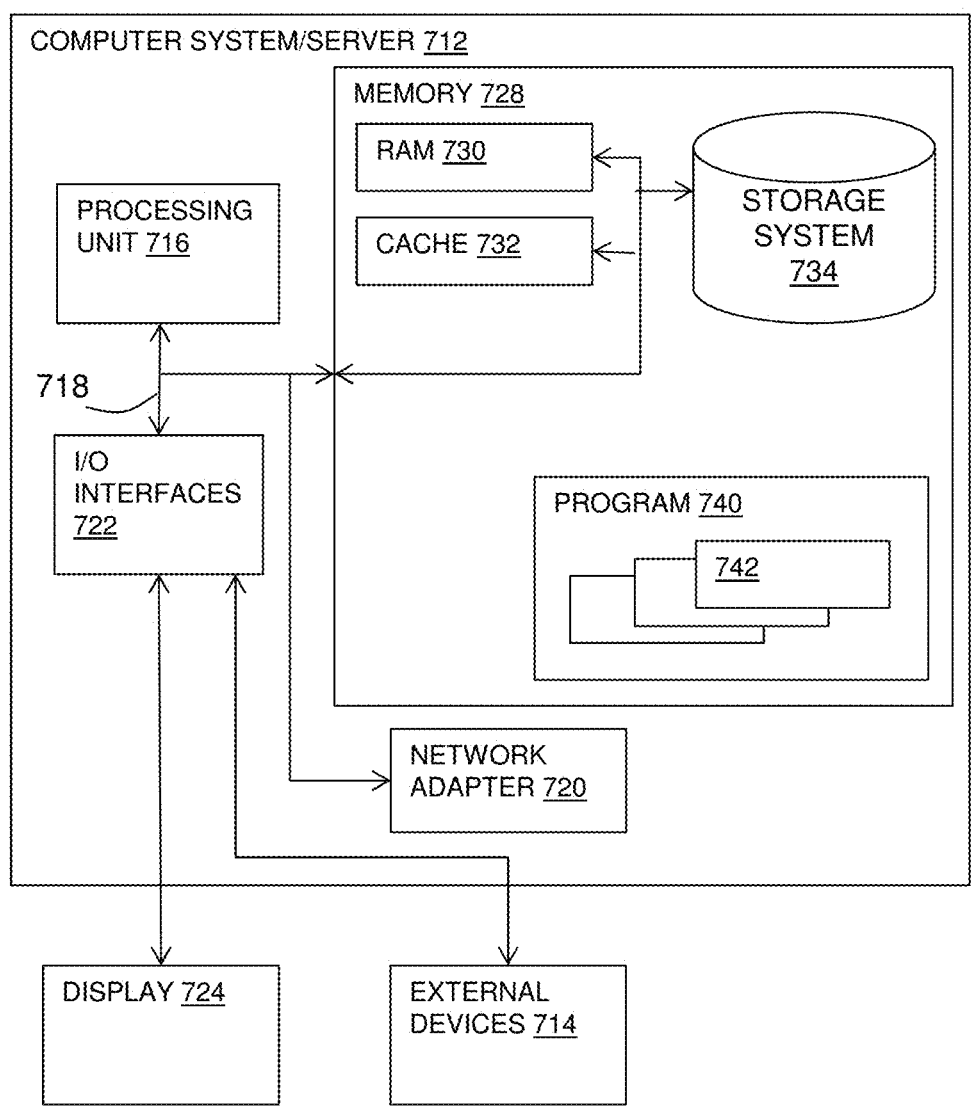
FIG. 7 is a block diagram of an embodiment of a computer system in which the present invention may be implemented.

Referring now to FIG. 7, a schematic of an example of a system 700 in the form of a computer system or server is shown in which the described system may be implemented.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM) an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can he rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e,g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations, Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
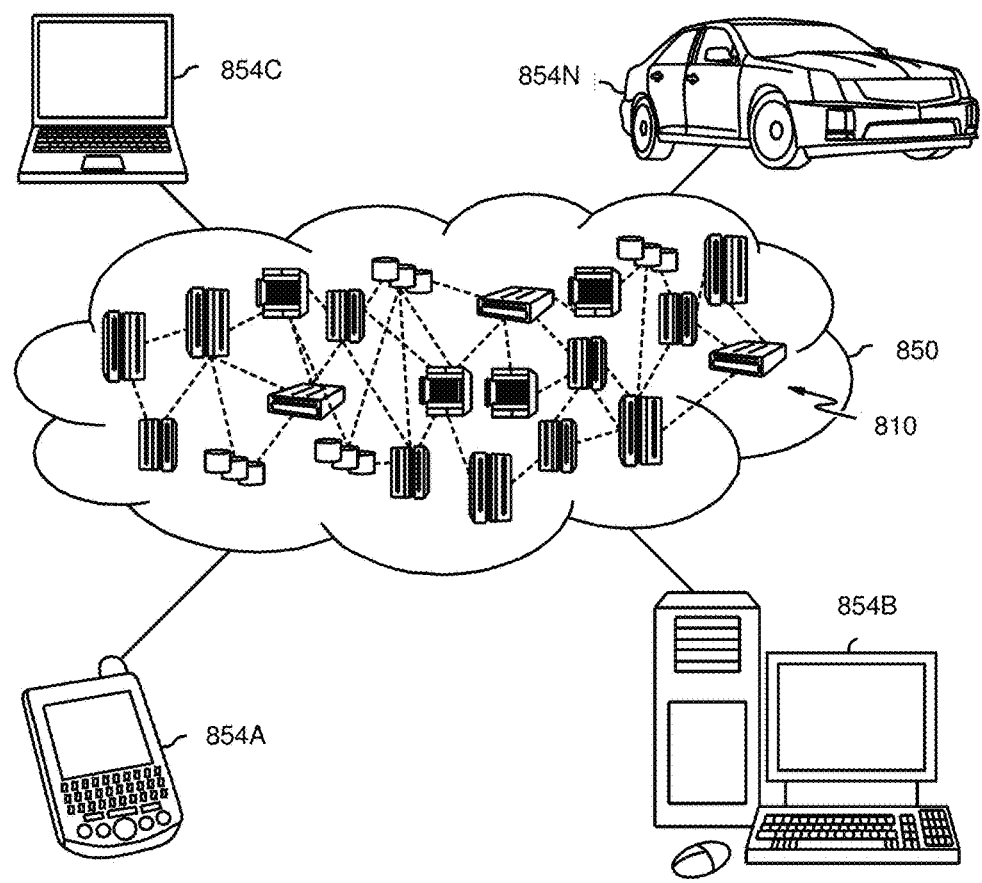
FIG. 8 is a schematic diagram of a cloud computing environment in which the present invention may be implemented.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
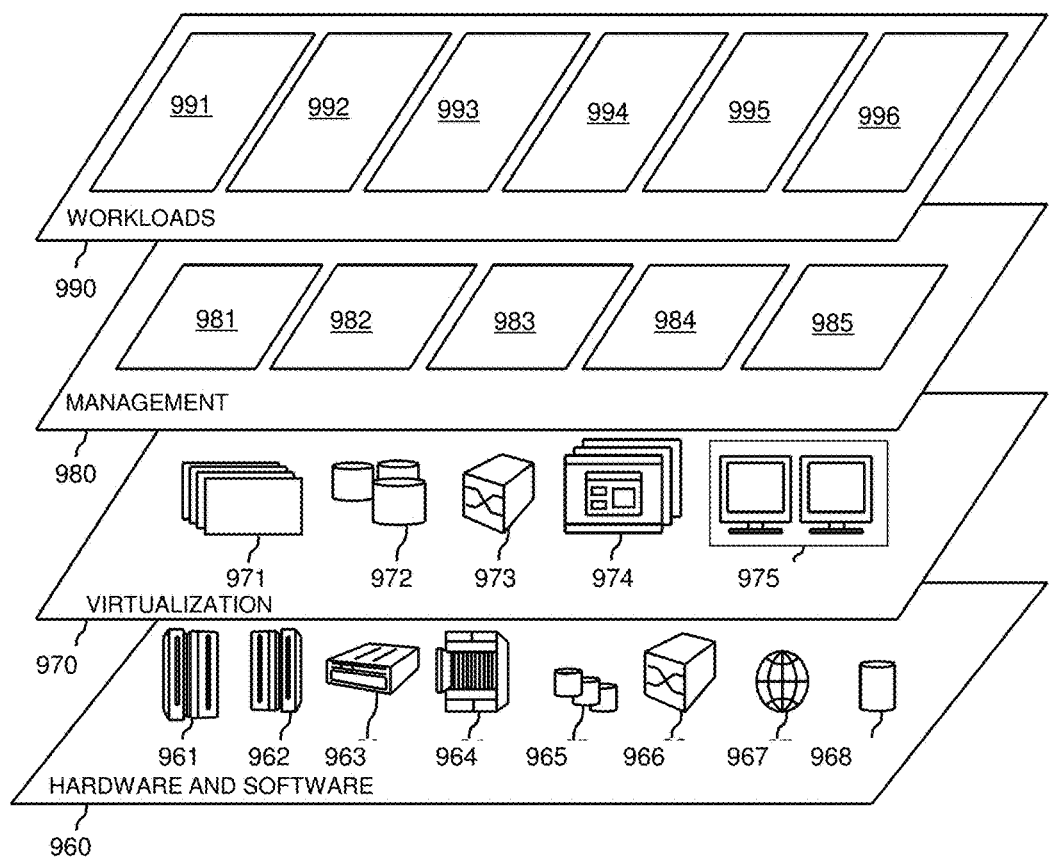
FIG. 9 is a diagram of abstraction model layers of a cloud computing environment in which the present invention may be implemented.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; and transaction processing 995 including as described herein; and NLP functionality 996 as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method, in a computer comprising at least one processor and at least one memory, the at least one memory comprising instructions that are executed by the at least one processor to cause the at least one processor to be configured to implement a semantic graph augmentation system for semantic graph augmentation for domain adaptation, the computer-implemented method comprising:
    receiving, by the semantic graph augmentation system, an existing semantic graph based on a knowledge base in which concepts are linked by semantic relationships, wherein the knowledge base is one of a resource description framework or an ontology;
    analyzing, by a corpus analyzer of the semantic graph augmentation system, a domain corpus of content in a new target domain separate from the knowledge base for adaptation with reference to one or more resources that provide syntactic analysis of the domain content that links portions of the domain corpus to existing concepts and links in the semantic graph;
    extracting, by a triple extractor of the semantic graph augmentation system, triples from the analysis of the domain corpus of any two concepts that share a linking syntactic relationship;
    evaluating, by an assertion generator of the semantic graph augmentation system, the triples as potential relationship assertions;
    selecting, by an assertion selector of the semantic graph augmentation system, a relationship assertion for addition as a new link between existing concepts in the semantic graph; and
    updating, by a link provider of the semantic graph augmentation system, the semantic graph to generate an augmented semantic graph including the new link between existing concepts in the semantic graph.

2. The method as claimed in claim 1, wherein the one or more resources include one or more of the group of: shallow syntax parsers, deep syntax parsers, and named entity recognizers.

3. The method as claimed in claim 1, wherein the triple extractor extracts triples for any two concepts that share a linking semantic relationship by extracting triples due to collocation or ordered pattern in parse tree structures or syntactic frames.

4. The method as claimed in claim 1, wherein a triple is formed of a subject, an object, and a linking relationship based on a syntactic relationship in the form of one of: a verb, noun-phrase constituents, possessive relationships in noun phrases, and other syntactic structures.

5. The method as claimed in claim 1, wherein the assertion generator evaluating the triples further comprises:
    statistically learning, by a statistical learner of the assertion generator, associated categories of concepts from unambiguous concepts that share a linking syntactic relationship.

6. The method as claimed in claim 5, wherein the assertion generator evaluating the triples further comprises:
    scoring, by an assertion scorer of the assertion generator, a potential relationship assertion according to learnt statistical data; and
    applying, by the assertion selector, a threshold score for selection of a potential relationship assertion.

7. The method as claimed in claim 5, the assertion generator evaluating the triples further comprises:
    using, by an ambiguous concept asserter of the assertion generator, scored potential relationship assertions to interpret ambiguous concepts that share a linking syntactic relationship.

8. The method as claimed in claim 1, the assertion generator evaluating the triples further comprises:
    receiving, by an assertion inputter of the assertion generator, input of manual constraints of triples using relationship assertions.

9. The method as claimed in claim 1, wherein the triple extractor extracting the triples further comprises:
    dynamically configuring, by a spreading activation strategizer of the triple extractor, a spreading activation strategy to boost the relevance of concept and relationship types; and
    activating, by a graph activator of the triple extractor, the semantic graph during processing of the domain corpus and performing word sense disambiguation and induction to filter irrelevant triples and/or generate triples.

10. The method as claimed in claim 1, wherein the assertion generator evaluating the triples as potential relationship assertions considers the directionality of potential relationship assertions and how they affect concepts at higher and lower levels of meaning and ensuring that a new link between concepts is only applied at appropriate levels.

11. The method as claimed in claim 1, wherein the assertion selector selecting a relationship assertion for addition as a new link is configured to be confined to leaf-level concepts only in the semantic graph or to extend to a higher-level concept based on an explicit assertion in the domain corpus.

12. A system comprising:
    at least one processor; and
    at least one memory coupled to the at least one processor, wherein the at least one memory comprises instructions which, when executed by the at least one processor, cause the at least one processor to implement a semantic graph augmentation system for semantic graph augmentation for domain adaptation, and further cause the at least one processor to:
    receive, by the semantic graph augmentation system, an existing semantic graph based on a knowledge base in which concepts are linked by semantic relationships, wherein the knowledge base is one of a resource description framework or an ontology;
    analyze, by a corpus analyzer of the semantic graph augmentation system, a domain corpus of content in a new target domain separate from the knowledge base for adaptation with reference to one or more resources that provide syntactic analysis of the domain content that links portions of the domain corpus to existing concepts and links in the semantic graph;
    extract, by a triple extractor of the semantic graph augmentation system, triples from the analysis of the domain corpus of any two concepts that share a linking syntactic relationship;
    evaluate, by an assertion generator of the semantic graph augmentation system, the triples as potential relationship assertions;
    select, by an assertion selector of the semantic graph augmentation system, a relationship assertion for addition as a new link between existing concepts in the semantic graph; and update, by a link provider of the semantic graph augmentation system, the semantic graph to generate an augmented semantic graph including the new link between existing concepts in the semantic graph.

13. The system as claimed in claim 12, wherein the one or more resources include one or more of the group of: shallow syntax parsers, deep syntax parsers, and named entity recognizers.

14. The system as claimed in claim 12, wherein the instructions to evaluate the triples further causes the at least one processor to:
statistically learn, by a statistical learner of the assertion generator, associated categories of concepts from unambiguous concepts that share a linking syntactic relationship.

15. The system as claimed in claim 14, wherein the instructions to evaluate the triples further causes the at least one processor to:
score, by an assertion scorer of the assertion generator, a potential relationship assertion according to learnt statistical data; and
apply, by the assertion selector, a threshold score for selection of a potential relationship assertion.

16. The system as claimed in claim 14, wherein the instructions to evaluate the triples further causes the at least one processor to:
use, by an ambiguous concept asserter of the assertion generator, scored potential relationship assertions to interpret ambiguous concepts that share a linking syntactic relationship.

17. The system as claimed in claim 12, wherein the instructions to evaluate the triples further causes the at least one processor to:
receive, by an assertion inputter of the assertion generator, input of manual constraints of triples using relationship assertions.

18. The system as claimed in claim 12, wherein the instructions to extract triples further causes the at least one processor to:
dynamically configure, by a spreading activation strategizer of the triple extractor, a spreading activation strategy to boost the relevance of concept and relationship types; and
activate, by a graph activator of the triple extractor, the semantic graph during processing of the domain corpus and performing word sense disambiguation and induction to filter irrelevant triples and/or generate triples.

19. The system as claimed in claim 12, Wherein the assertion generator evaluating the triples as potential relationship assertions considers the directionality of potential relationship assertions and how they affect concepts at higher and lower levels of meaning and ensuring that a new link between concepts is only applied at appropriate levels.

20. The system as claimed in claim 12, wherein the assertion selector selecting a relationship assertion for addition as a new link is configured to be confined to leaf-level concepts only in the semantic graph or to extend to a higher-level concept based on an explicit assertion in the domain corpus.

21. A computer program product comprising a computer readable storage medium having a computer readable program embodied therewith, wherein the computer readable program, when executed on a data processing system, causes the data processing system to implement a semantic graph augmentation system for semantic graph augmentation for domain adaptation and further cause the data processing system to:
receive, by the semantic graph augmentation system, an existing semantic graph based on a knowledge base in which concepts are linked by semantic relationships, wherein the knowledge base is one of a resource description framework or an ontology;
analyze, by a corpus analyzer of the semantic graph augmentation system, a domain corpus of content in a new target domain separate from the knowledge base for adaptation with reference to one or more resources that provide syntactic analysis of the domain content that links portions of the domain corpus to existing concepts and links in the semantic graph;
extract, by a triple extractor of the semantic graph augmentation system, triples from the analysis of the domain corpus of any two concepts that share a linking syntactic relationship;
evaluate, by an assertion generator of the semantic graph augmentation system, the triples as potential relationship assertions;
select, by an assertion selector of the semantic graph augmentation system, a relationship assertion for addition as a new link between existing concepts in the semantic graph; and
update, by a link provider of the semantic graph augmentation system, the semantic graph to generate an augmented semantic graph including the new link between existing concepts in the semantic graph.

* * * * *